US006932236B2

(12) United States Patent
Ven Huizen

(10) Patent No.: US 6,932,236 B2
(45) Date of Patent: Aug. 23, 2005

(54) METHOD AND APPARATUS FOR IMPROVING THE EFFICIENCY OF A JOHN DEERE VACUUM PLANTER

(76) Inventor: Dale A. Ven Huizen, 1954 TL Rte. 78 N., Stockton, IL (US) 61085

(*) Notice: Subject to any disclaimer, the term of this patent is extended or adjusted under 35 U.S.C. 154(b) by 57 days.

(21) Appl. No.: 10/109,194

(22) Filed: Mar. 28, 2002

(65) Prior Publication Data

US 2003/0183647 A1 Oct. 2, 2003

(51) Int. Cl.$^7$ .......................... B23Q 7/04; B65G 59/04; B65H 3/08; G07F 11/10; A01C 00/00
(52) U.S. Cl. ....................... 221/211; 221/185; 221/209; 111/77
(58) Field of Search ................................ 221/211, 185, 221/209; 111/77

(56) References Cited

U.S. PATENT DOCUMENTS

| | | | | |
|---|---|---|---|---|
| 3,990,606 A | * | 11/1976 | Gugenhan | 221/211 |
| 4,019,651 A | * | 4/1977 | Starr et al. | 221/211 |
| 4,515,291 A | * | 5/1985 | Holmes | 221/211 |
| 4,600,122 A | | 7/1986 | Lundie | |
| 4,703,868 A | * | 11/1987 | Shaw | 221/211 |
| 4,793,511 A | | 12/1988 | Ankum | |
| 5,170,909 A | * | 12/1992 | Lundie et al. | 221/211 |
| 5,501,366 A | * | 3/1996 | Fiorido | 221/211 |
| 5,535,917 A | * | 7/1996 | Ribouleau | 221/211 |
| 6,176,393 B1 | | 1/2001 | Luxon | |
| 6,374,759 B1 | * | 4/2002 | Crabb et al. | 111/185 |
| 6,718,892 B1 | * | 4/2004 | Rosenboom | 111/185 |

FOREIGN PATENT DOCUMENTS

GB     1134415     *  3/1968  ............ A21B/5/00

OTHER PUBLICATIONS

John Deere 1770 Front–Fold Maxmerge Plus Operating Manual, Sep. 1992, pp25–1 through 25–21.*
John Deere Operators Manual for a 1770 Front Fold Maxemerge Plus Drawn Conservation Planter Copyright 2001 OMA69681 Issue E1 English Deere & Company, Moline Illinois.

* cited by examiner

Primary Examiner—Donald P. Walsh
Assistant Examiner—Michael Butler
(74) Attorney, Agent, or Firm—Robert L. Marsh

(57) ABSTRACT

The efficiency of a John Deere planter to plant corn seed is improved where the planter is of the type having a vacuum operated metering unit enclosing a seed disk and a double eliminator. To improve the efficiency a kit is provided including an improved seed disk, an improved double eliminator, and an alignment tool for properly aligning the double eliminator with respect to the seed disk. When the parts are installed and properly aligned the planter can accept corn seed in the range of 1200 seeds per pound to 2800 seeds per pound without requiring readjustment of the vacuum setting or replacing the seed disk.

8 Claims, 15 Drawing Sheets

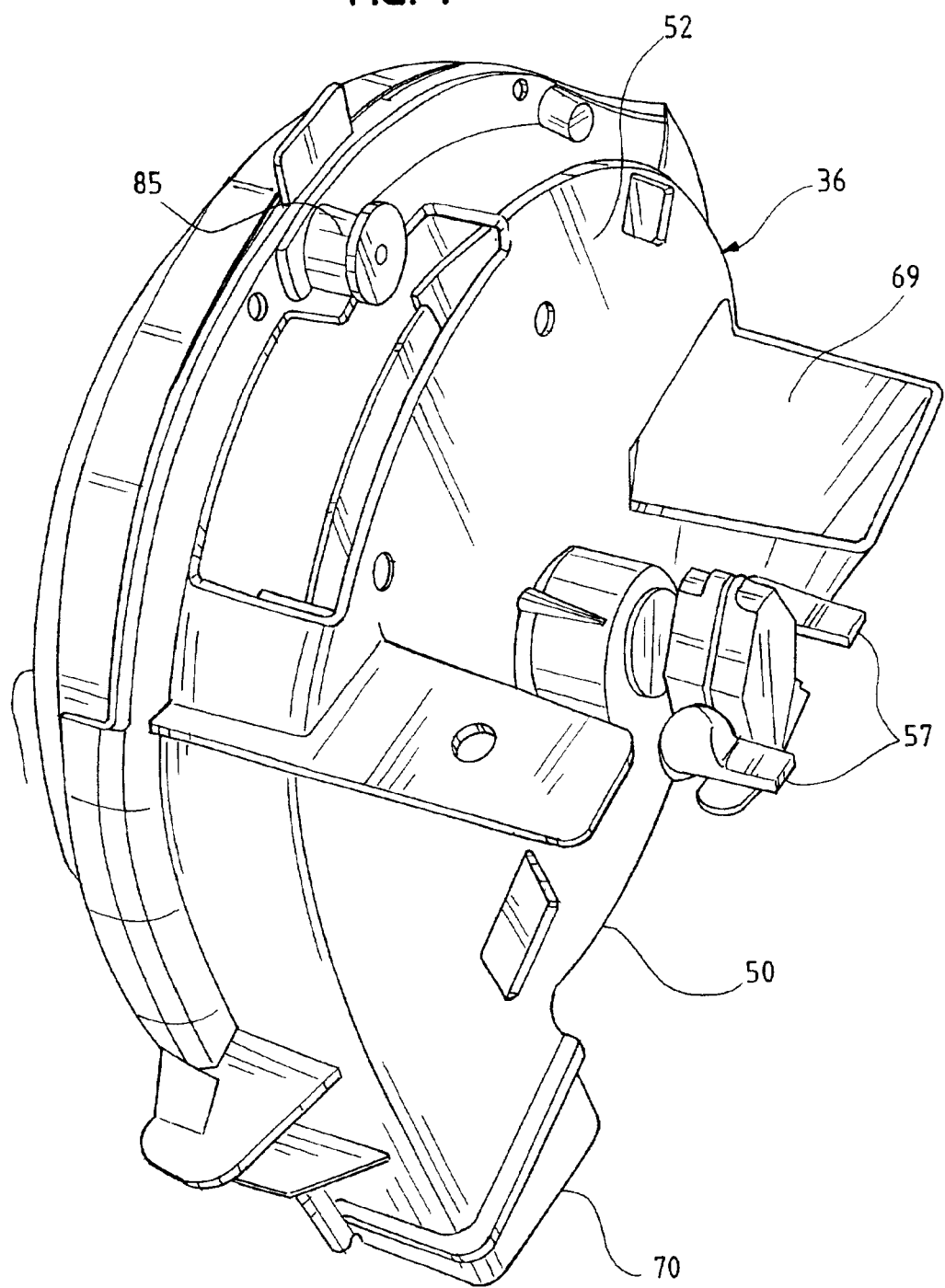

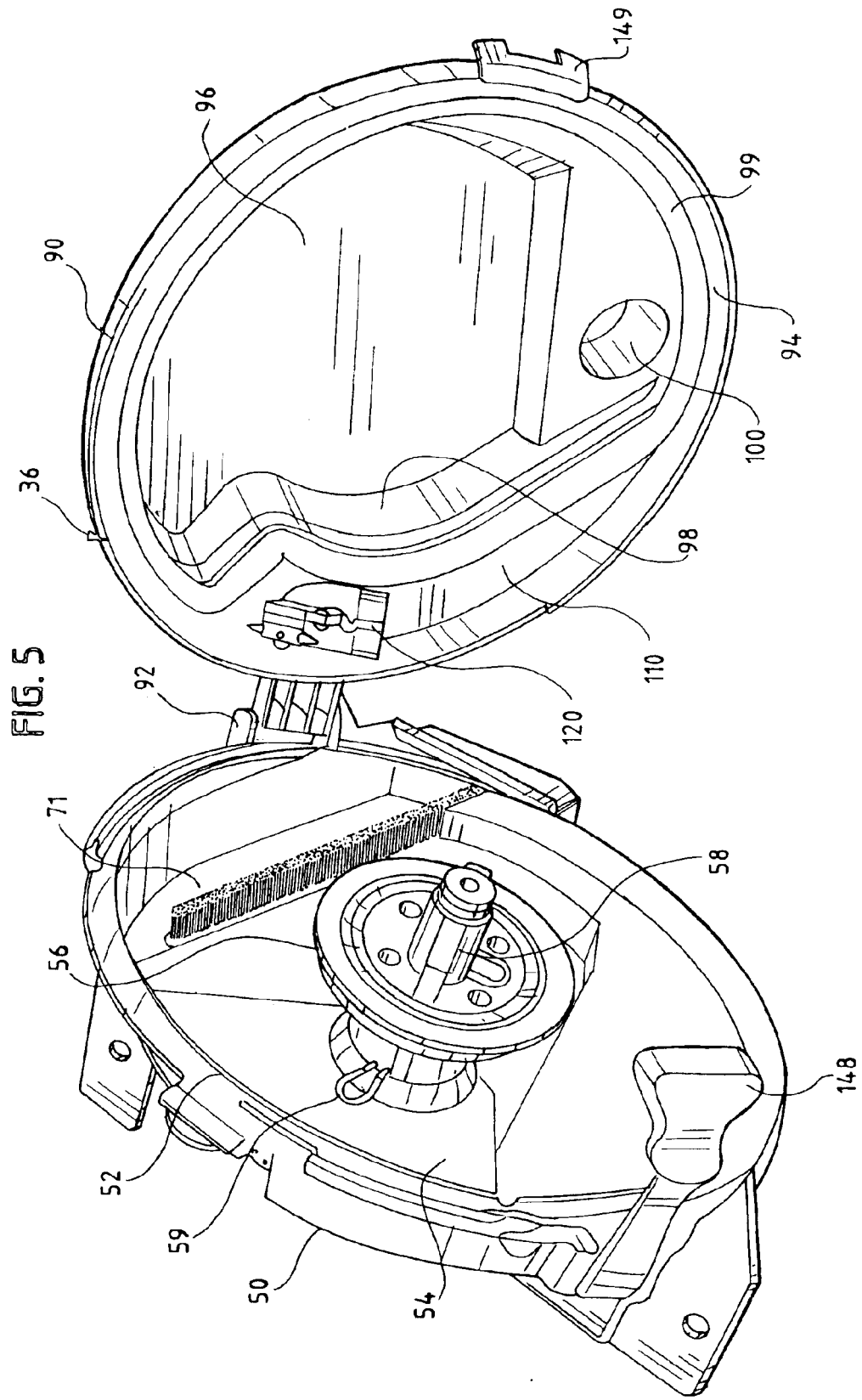

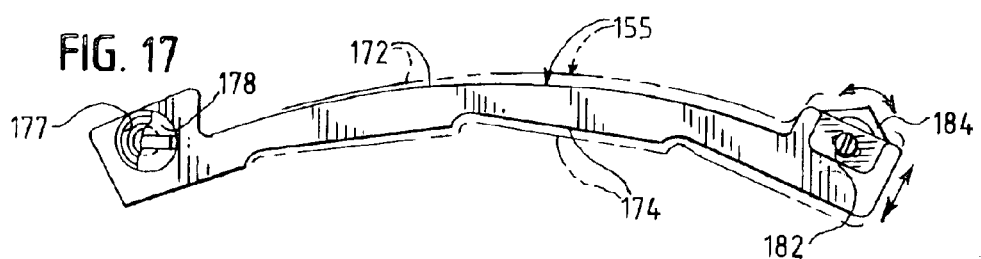
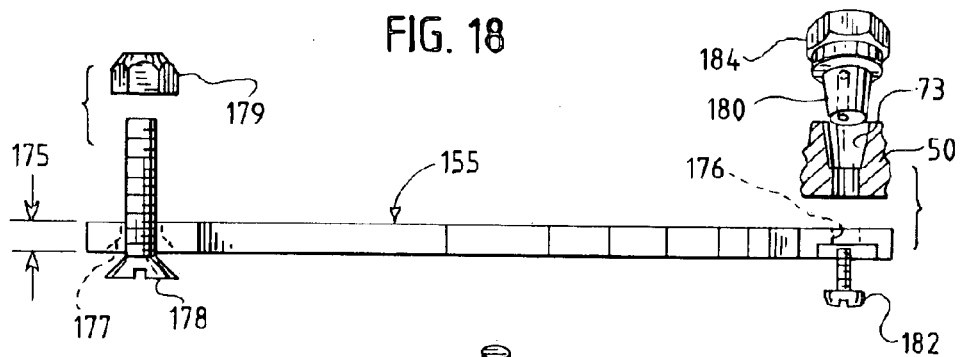
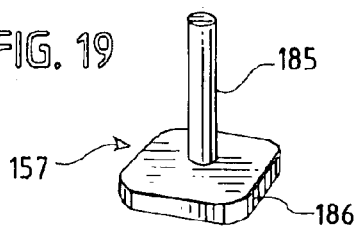
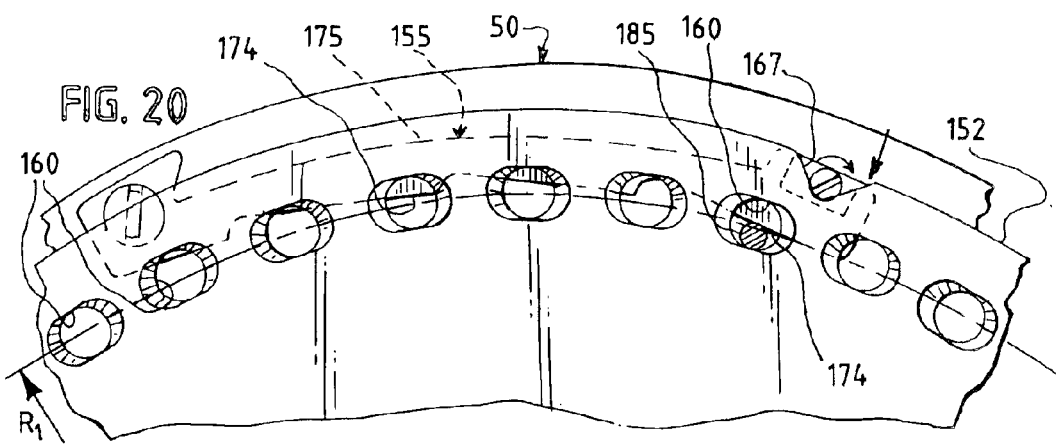
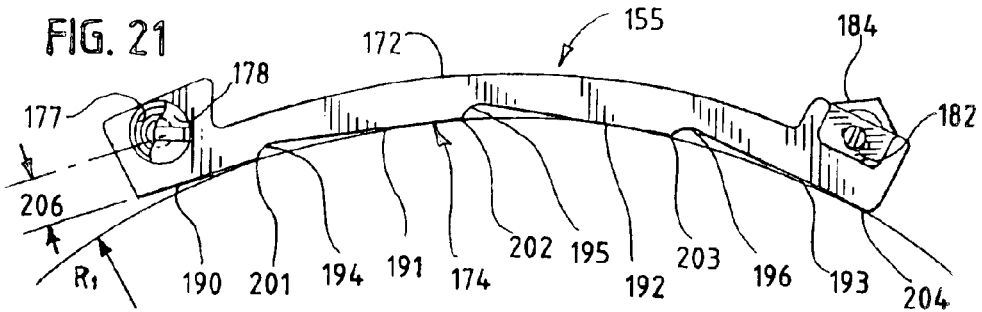

METHOD AND APPARATUS FOR IMPROVING THE EFFICIENCY OF A JOHN DEERE VACUUM PLANTER

The present invention relates to seed planters of the type manufactured by John Deere which receives a rotatable seed disk, where each disk has a plurality of spaced holes sized to accommodate the planting of a given seed type or seed size and, in particular, to a method and apparatus for improving the efficiency of such machines in the planting of corn seed.

BACKGROUND OF THE INVENTION

John Deere manufactures a Max Emerge Drawn Conservation Flex-fold planter. The heart of the John Deere planter is a metering unit which retains a circular rotatable seed disk that separates the interior of the metering unit into two chambers, one on each side of the disk. The seed disks employed in the machine have a plurality of holes, with the centers thereof spaced to define a circle with its center at the center of the disk and having a radius a little less than the radius of the disk. A vacuum is drawn in the chamber formed on one side of the disk and seeds are introduced into the chamber on the opposite side of the disk. The diameter of the holes in the seed disks are sized such that, when operating properly, the vacuum will draw one seed against the aperture of each hole in the disk and retain the seed as the disk rotates to a position above a seed chute, at which point the disk moves away from the vacuum chamber and the seed falls away from the disk and into the chute to be planted.

The planter is intended for use with many types of seed, including sunflower, cotton, soybean, sorghum, sugar beets, popcorn, sweet corn, and corn seed (feed corn seed). Each type of seed has a different size and configuration and the planter is, therefore, provided with a plurality of seed disks, which each of the seed disks having a different configuration of holes through which the vacuum is drawn to move seeds from the input to the chute.

The manual for the 7200 Max Emerge, 16 row, narrow flex-fold planter, for example, describes and depicts thirteen different seed disks. According to the manual, the seed size for certain grains, such as corn seed, vary widely. The manual recommends disk H136478 for the smallest sized corn seed, recommends disk A43215 for medium sized corn seed, and recommends disk A50617 for large sized corn seed.

Another variable for the John Deere planter is the vacuum which is drawn to retain the seeds against the apertures of the seed disk. For corn seed, the vacuum level, expressed "inches of water," ranges from three as a minimum to thirteen as a maximum, as shown in a chart depicted in the manual and generally reconstructed in FIG. 15. Two optional pieces of equipment are provided, the use of which is recommended under certain planting situations and is not recommended in other situations, namely a double eliminator and knockout assembly. The double eliminator is intended to prevent the depositing of two seeds in one planting site or hole, and the knockout assembly pushes out seeds that become wedged in the vacuum holes. The configuration of vacuum holes is different for each seed disk and John Deere does not provide a double eliminator or a knockout assembly for each one of its seed disks.

The proper operation of the John Deere planter, therefore, requires the selection of the appropriate seed disk for use with the size and type of seed to be planted, the appropriate adjustments to the vacuum, and in some cases the installation of one or both a optional double eliminator and a knockout assembly. It is also recommended that the machine be monitored during its use and that the strength of the vacuum be adjusted if the machine is found to be under planting or over planting seed.

The machine is considered to be operating at 100% efficiency if it will plant 100 seeds in 100 holes. Where the machine plants 98 seeds in one hundred holes, it is considered to be operating at 98% efficiency and where is planting 102 seeds in every 100 holes (a second seed into each of two holes), the machine is considered to be operating at 102% efficiency. A farmer will consider a machine operating at 95% or at 105% to be unacceptably inefficient and in either case will be required to adjust the vacuum or replace the seed disks of the machine to improve its efficiency. The satisfactory operating range for such machines is between 99% and 101% efficiency.

The planters manufactured by John Deere are adapted to plant from four to thirty one rows simultaneously with a hopper retaining seed, a seed disk and a double eliminator setting for each row to be planted by the machine. If the operator changes the size of the seed being planted such that the machine, as it is then configured, will on longer maintaining the required efficiency, he must stop his tractor, change the parts within the metering units, adjust the double eliminator and adjust the vacuum for the machine. It can take a farmer an hour or more to reconfigure his machine to accommodate a change in seed size.

Ideally each row of a planter will plant between 99% and 101% efficiency. Generally, farmers having a John Deere planter would be satisfied if their machines will plant corn seed at between 95% and 105% efficiency, but such rates are difficult to maintain, or even achieve because the temperamental nature of the metering units. Many farmers will set the warning alarms on their machine to sound when the efficiency of the planter falls outside the range of 90% to 110% because beyond that range the loss of crop at the planting stage is intolerable. When the machine operates beyond that range the operator will stop the machine and reconfigure the metering units as described above.

The difficulties of maintaining proper efficiency are accentuated in the case of corn seed, which is one of the major grains for which the John Deere planter is employed. As shown in FIG. 16, corn seed ranges in size from as small as 3,100 seeds per pound to as a maximum of 900 seeds per pound. Although it would be desirable for a farmer to obtain seed which is of all the same size, as a practical matter, he must deal with seeds of varying size. As previously stated, John Deere offers three different seed disks for use in planting corn seed, one disk for each of three ranges of seed size.

John Deere has many thousands of Max Emerge planters, many of which are now being employed to plant corn seed. Farmers have found that, with respect to the planting of corn seed, the John Deere planter can best be described as temperamental. Even with frequent vacuum adjustments and the changing of seed disks, farmers have not been able to maintain the efficiency of such planters within the desired 99% to 101% range and have been forced to accept performance in the 90% to 95% range. It would, therefore, be desirable to provide a kit for modifying the metering unit of the John Deere planter to improve the efficiency with which the planter will plant corn seed.

SUMMARY OF THE INVENTION

Briefly, the present invention is embodied in a method of improving the efficiency of a seed planter of the type manufactured by John Deere, having a metering unit for retaining a circular rotatable seed disk where the seed disk has a center, first and second opposing surfaces, and has a plurality of transverse spaced holes through the disk where the centers of the holes define a circle having its center at the center of the disk. To select individual seeds for planting, seed is introduced into a first cavity in the housing defined by the first surface of the seed disk and a vacuum in drawn in a second cavity defined by the second surface of the seed disk such that the vacuum draws individual seeds against the transverse holes in the seed disk.

In accordance with the invention, a replacement seed disk is provided where the disk has a plurality of at least forty equally spaced holes (instead of a thirty hole disk recommended by John Deere for use for planting most sizes of corn), the holes being positioned around the outer edge of the disk with each of the holes having a diameter of $3/16$ inch±$1/128$ inch. Each transverse hole has a 45 degree angle countersink on the first side of the seed disk, the maximum diameter of which is $15/64$±128 inch, such that the vacuum force needed to retain the seeds is applied over a somewhat larger area. It is desirable to provide a countersink to expand the area across which the vacuum is drawn rather than simply making the size of the vacuum holes larger because the smaller size seed will become stuck in vacuum holes larger than $3/16$ inch.

The replacement seed disk described above is used in the metering units of the planter in place of those recommended by the manufacturer. A seed disk having a countersink as described applies the force of the vacuum across a larger surface area thereby enabling the disk to effectively retain a larger size corn seed.

A double eliminator preferably made of stamped metal having a contour of the double eliminator manufactured by John Deere, but made in a stamping process and having a thickness of $5/32$ to $11/64$ inch (instead of $3/16$ inch as does the double eliminators manufactured by John Deere), is installed in each metering unit. Finally, a knockout assembly of the type manufactured by John Deere and suitable for use with the above described replacement disk is installed into each metering unit. The vacuum for the metering units is adjusted to 10 to 12 inches of water and maintained at this setting for all sizes of seed.

I have found that a planter fitted with a seed disk, a double eliminator and a knockout assembly as described above can be operated for all sizes of seed for corn seed without requiring adjustment of the vacuum outside of the range defined by 10 to 12 inches of water. An operator of a John Deere planter which has been modified in accordance with the invention will plant all seed ranging in size from 1200 seeds per pound to 2800 seeds per pound at 99% to 101% efficiency, regardless of the mix of sizes of the corn seed in the seed hoppers of the machine.

The invention can be employed in the form of a kit for use with a planter having a metering unit of the type manufactured by John Deere. The kit includes a seed disk having a plurality of equally space transverse holes with the holes positioned around the perimeter of the disk, and the holes having diameters of $3/16$ inch±$1/128$ inch with the aperture of the holes on the second surface of the disk have a countersink. In addition to the seed disk, the kit includes a double eliminator and a knockout assembly for use with the seed disk, the double eliminator having a thickness of $5/32$ to $11/64$ inch. An alignment tool consisting of a cylindrical peg approximately one inch in length and having a planar member across one end thereof is provided to properly adjust the cam of the double eliminator. Finally the kit includes a set of written instructions directing the operator to install the disk, the double eliminator and knockout assembly into the housing of the planter and to adjust the vacuum to a setting of 10 to 12 inches of water. The device will operate reliably at stronger vacuum settings but the stronger vacuum setting consumes unnecessary energy. Where the vacuum is set to 9 inches of water or less the vacuum will be inadequate to retain the larger corn seed.

BRIEF DESCRIPTION OF THE DRAWINGS

A better and more complete understanding of the invention will be had after a reading of the following detailed description taken in conjunction with the drawings wherein:

FIG. 4 is an isometric view of a metering unit for the row unit shown in FIG. 3;

FIG. 5 is an isometric view of the metering unit as shown in FIG. 4 with the housing opened to show the interior thereof;

FIG. 17 is a front elevational view of a double eliminator in accordance with the present invention;

FIG. 18 is an exploded side view of the double eliminator as shown in FIG. 17;

FIG. 19 is an isometric view of an alignment tool for use with the double eliminator shown in FIG. 17;

FIG. 20 is fragmentary enlarged front view of the first housing member as shown in FIG. 7 with the double eliminator shown in broken lines behind the seed disk as the double eliminator is being aligned using the tool shown in FIG. 19; and FIG. 21 is a front elevational view of the double eliminator shown in FIG. 17 showing the relationships of the parts thereof.

DETAILED DESCRIPTION OF A PREFERRED EMBODIMENT

Figure 1:
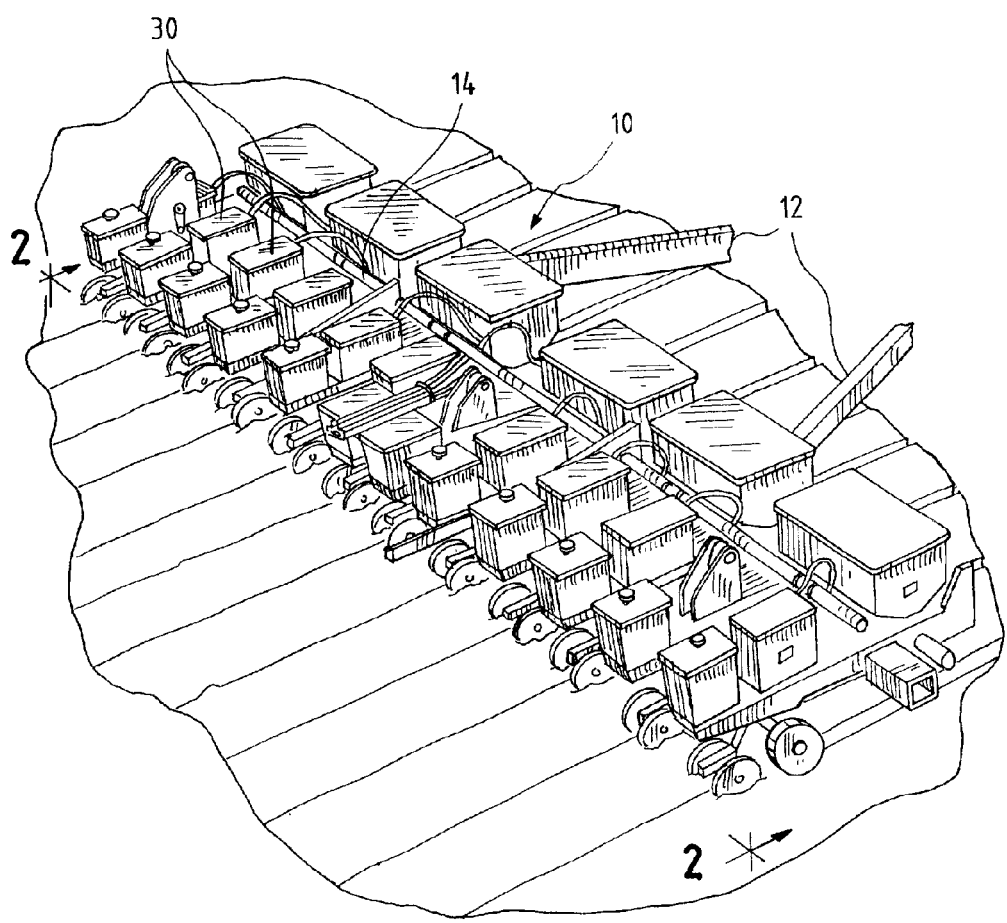
FIG. 1 is a an isometric view of a John Deere planter.
Figure 2:
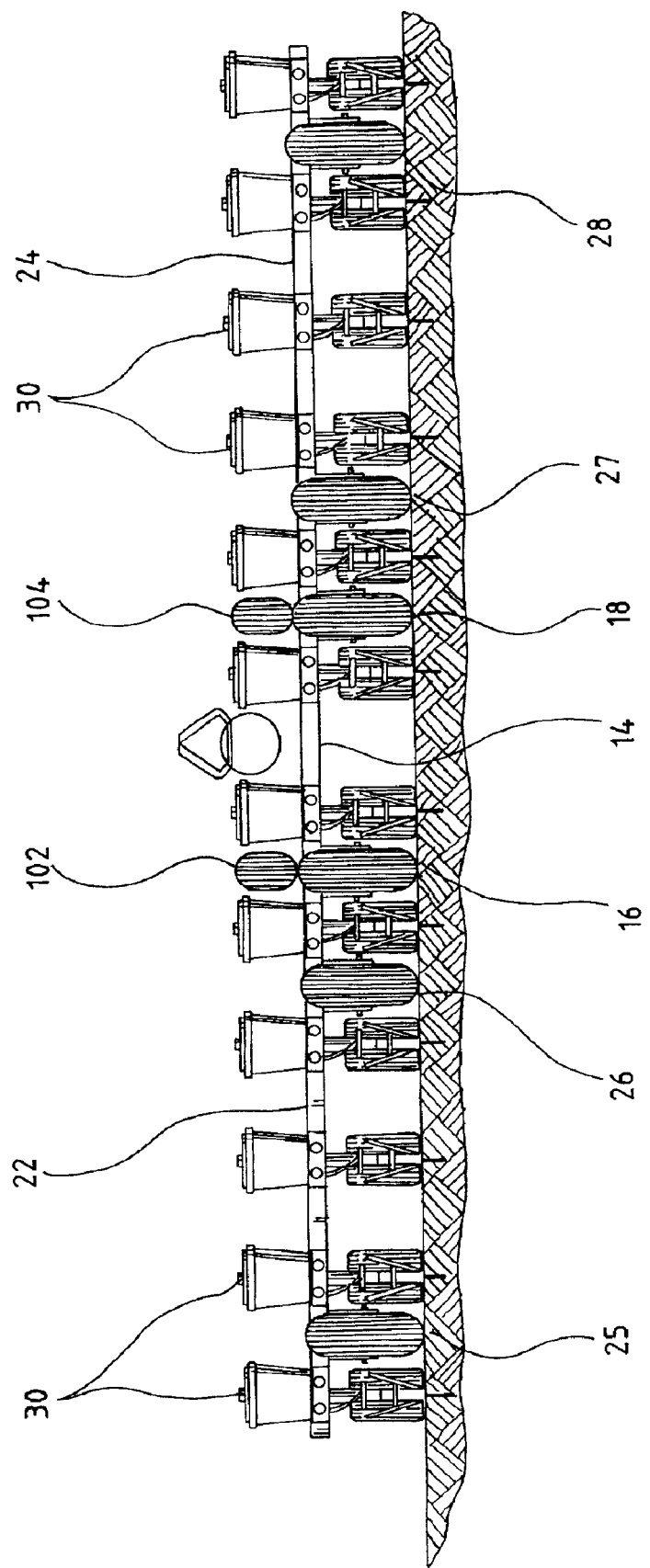
FIG. 2 is a rear elevational view of the John Deere planter shown in FIG. 1.

Referring to FIGS. 1 and 2, a John Deere planter such as a 7200 Max Emerge Flex-fold planter 10 includes a pair of elongate tow bars 12 at the rearward end of which is a cross bar 14 having wheels 16, 18 for transporting the planter 10 across the open highway. Attached by pivots, not visible, to the cross bar 14 are end sections 22, 24 having wheels 25, 26 and 27, 28 respectively. The pivots permit movement of the end sections 22, 24 from a first position in which they are folded against the tow bars 12 for transporting across an open highway, to a second position, depicted in FIGS. 2 and 3, in which they extend linearly outward from the ends of the cross bar 14. Extending along the length of the cross bar 14 and the extension sections 22, 24 are a plurality of row units 30—30. John Deere manufactures planters 10 which vary in width from four to thirty one row units.

The model 7200 planter was first offered in 1987 and since then John Deere has placed several other models on the market including models 1750, 1760, 1770, and 1780, each of which has corresponding parts and the performances of all of which are improved by the use of the present invention.

Figure 3:
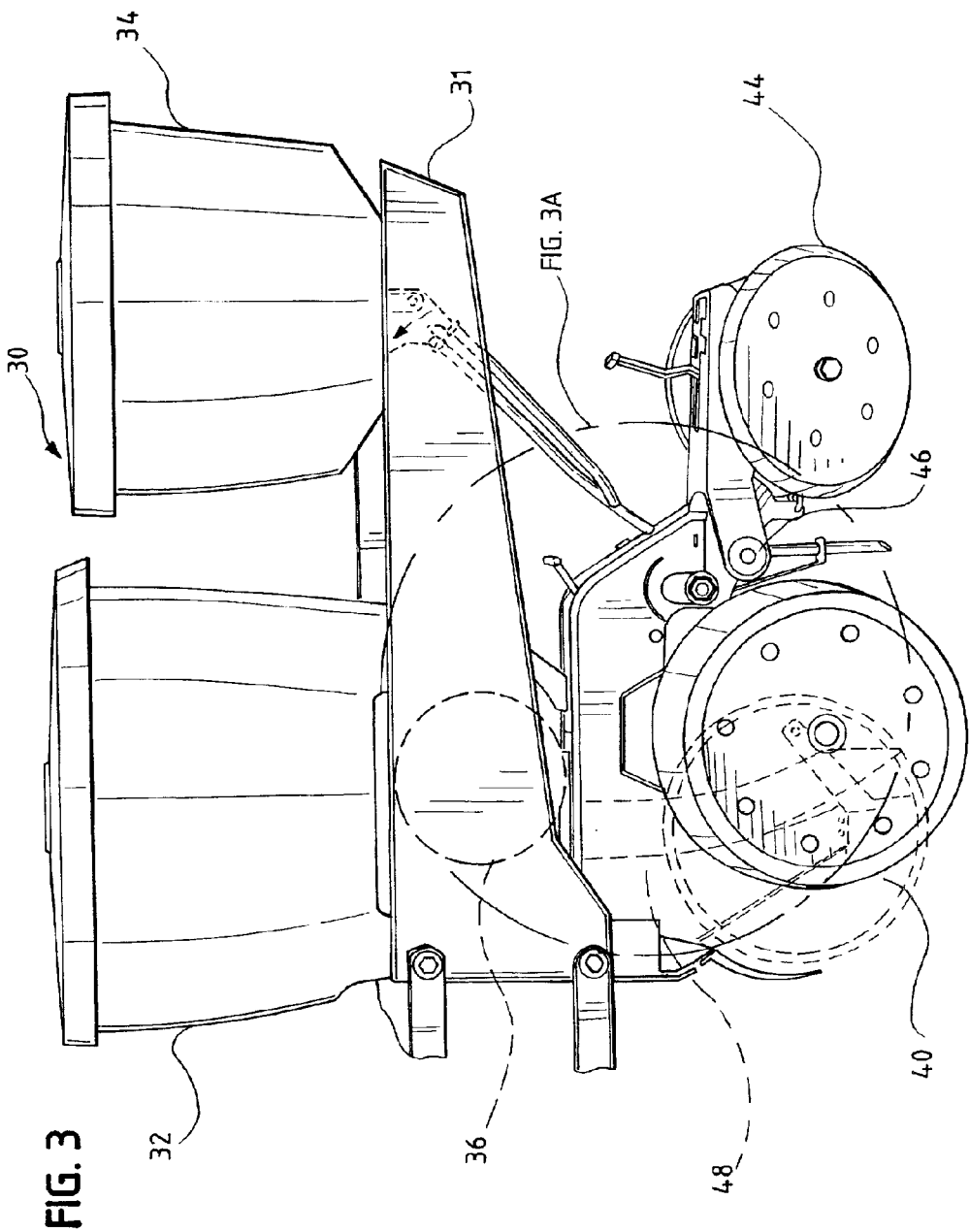
FIG. 3 is a side elevational view of a row unit of the planter shown in FIG. 1 with the metering unit therein shown in broken lines.
Figure 3A:
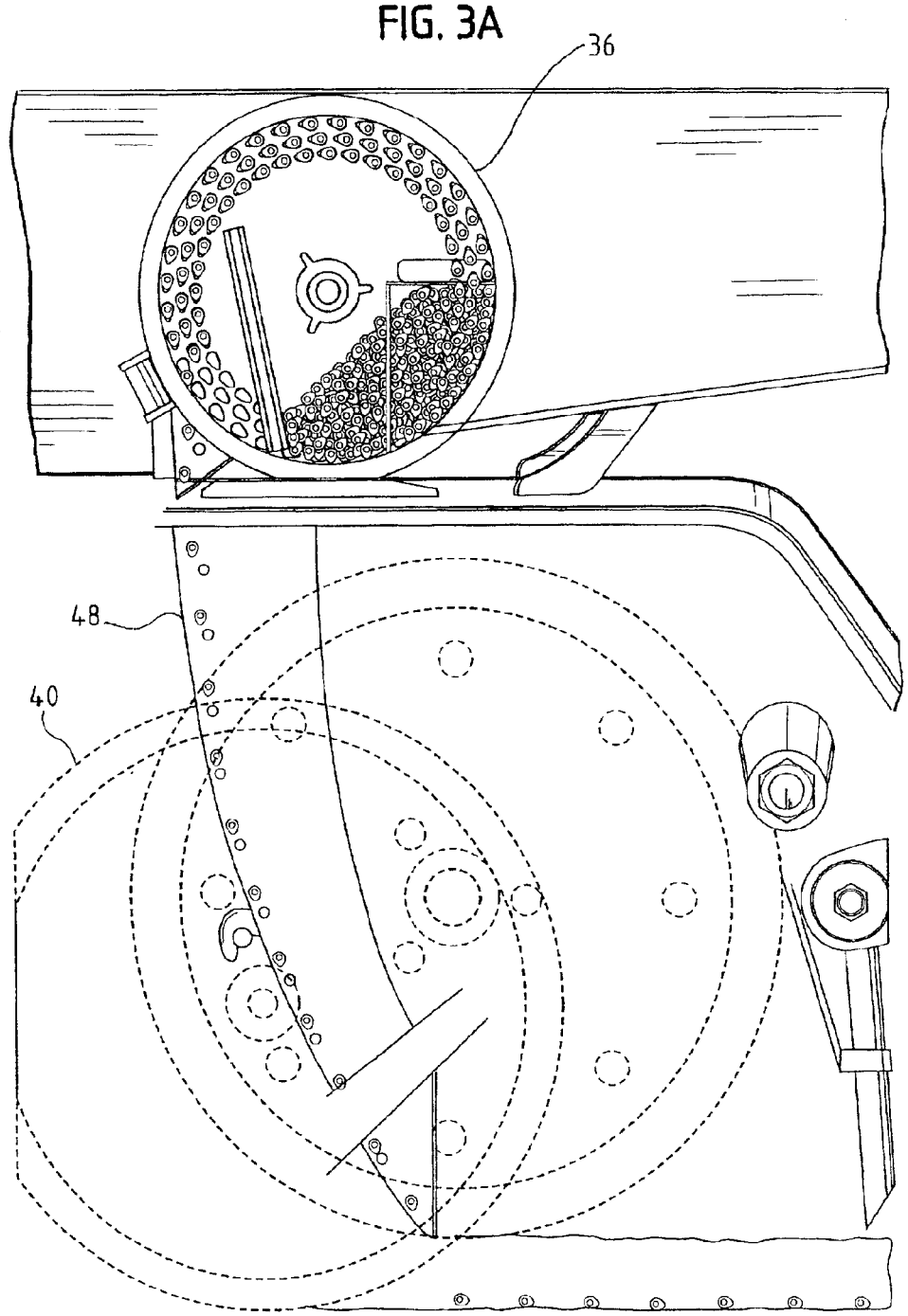
FIG. 3A is an enlarged fragmentary side elevational view of the row unit shown in FIG. 3 with the metering unit visible within.
Figure 8:
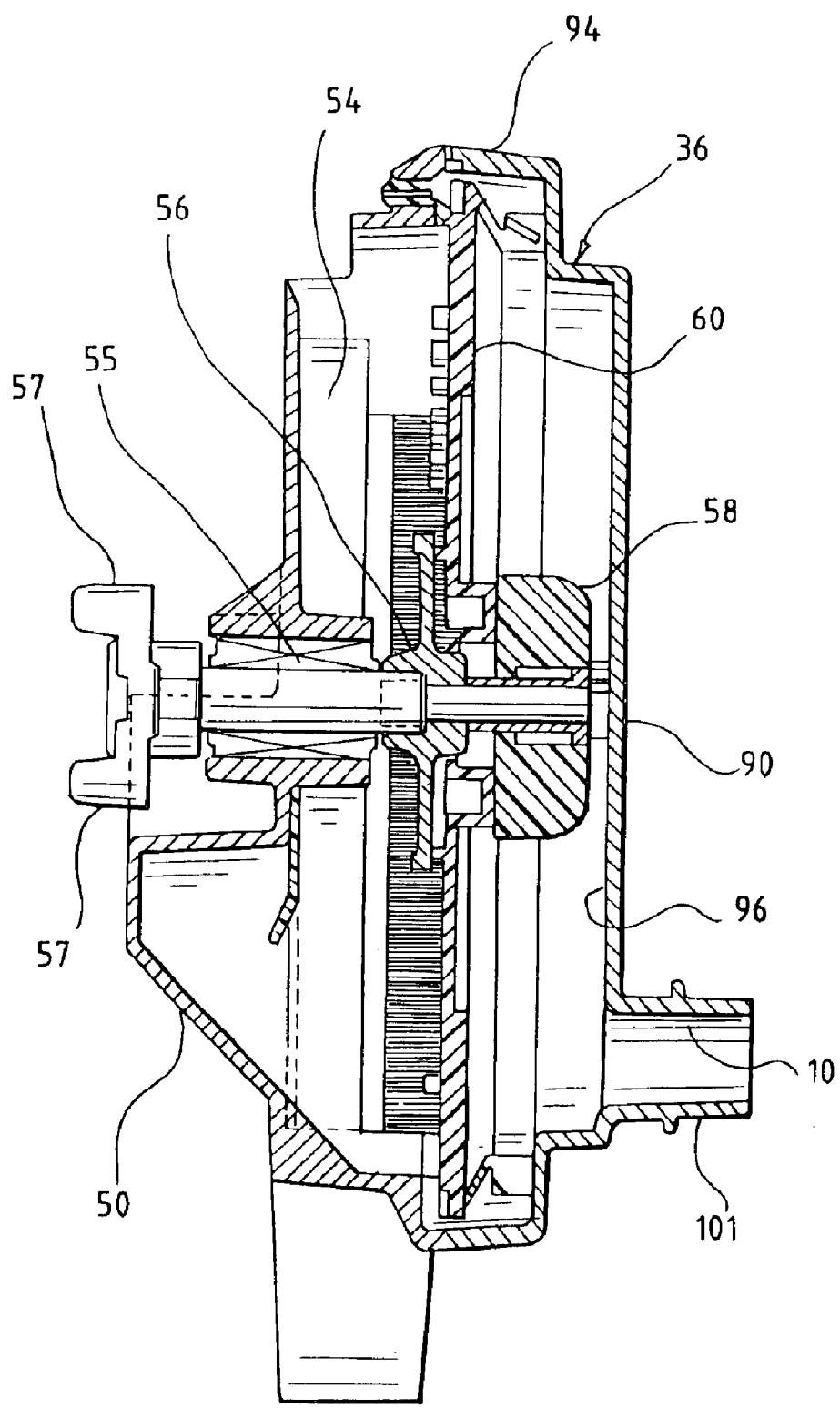
FIG. 8 is a cross-sectional view of the metering unit shown in FIG. 4.

Referring to FIG. 3, 3A and 8, each row unit 30 has a frame 31 on which is mounted a first hopper 32 for retaining seed and a second hopper 34 for retaining a dry herbicide. Below the seed hopper 32 is a metering unit 36 and a chute, not shown, directs seed from the hopper 32 to the metering unit 36. Below the metering unit 36 are opener discs 40. Rearward of the opener discs 40 are closing wheels 44, the elevation of which is adjustable through a pivot 46 to thereby permit the opener discs 44 to create a trench of the depth desired for the seed being planted.

A second chute 48 extends from the metering unit 36 to a position between the opener discs 40 for directing individual seeds singulated by the metering unit 36 into the furrow of ground formed by the opener discs 40, thereby planting the seed. A gearing assembly, not shown, connected to the wheels 16, 18, 25–28 rotates a drive member, not shown, which engages a winged connector 57 on the inner shaft 55 of the metering unit 36 at a speed that is coordinated to the ground speed of the planter 10 to insure that the planter 10 will plant seeds at the desired spacing.

Referring to FIGS. 4, 5, 6, 7 and 8, the metering unit 36 includes a first housing member 50, having a generally cylindrical outer wall 52 and a planar rear wall 54 thereby forming a cavity. Extending from the rear wall 54, axially with respect to the cylindrical outer wall 52, is a tubular retaining hub 56 at the distal end of which is a winged hub handle 58 which is rotatable between a first position for receiving or removing a seed disk 60 (shown in FIGS. 9 and 10) and a second position for retaining a seed disk 60 on the hub 56.

Referring to FIGS. 5 and 8, the retaining hub 56 is threaded on a cylindrical drive shaft 55 at the distal end of which are a pair of flanges 57 for drivingly engaging a drive member, not shown, which in turn is drivingly connected by the gearing, also not shown, to the wheels 16, 18, 25–28. A removable spring locking pin 59 extends through holes, not shown, in the tubular retaining hub 56 and through the inner drive shaft 55. By removing the spring locking pin 59, the retaining hub 56 can be rotated with respect to the inner shaft to thereby axially move the retaining hub 56 with respect to the rear wall 54 of the first housing member 50. Rotating the retaining hub 56 clockwise with respect to the drive shaft moves a seed disk 60 retained thereon toward the rear wall 54 and rotating the retaining hub 56 counter clockwise moves a seed disk 60 thereon away from the rear wall 54 of the first housing member 50.

Figure 9:
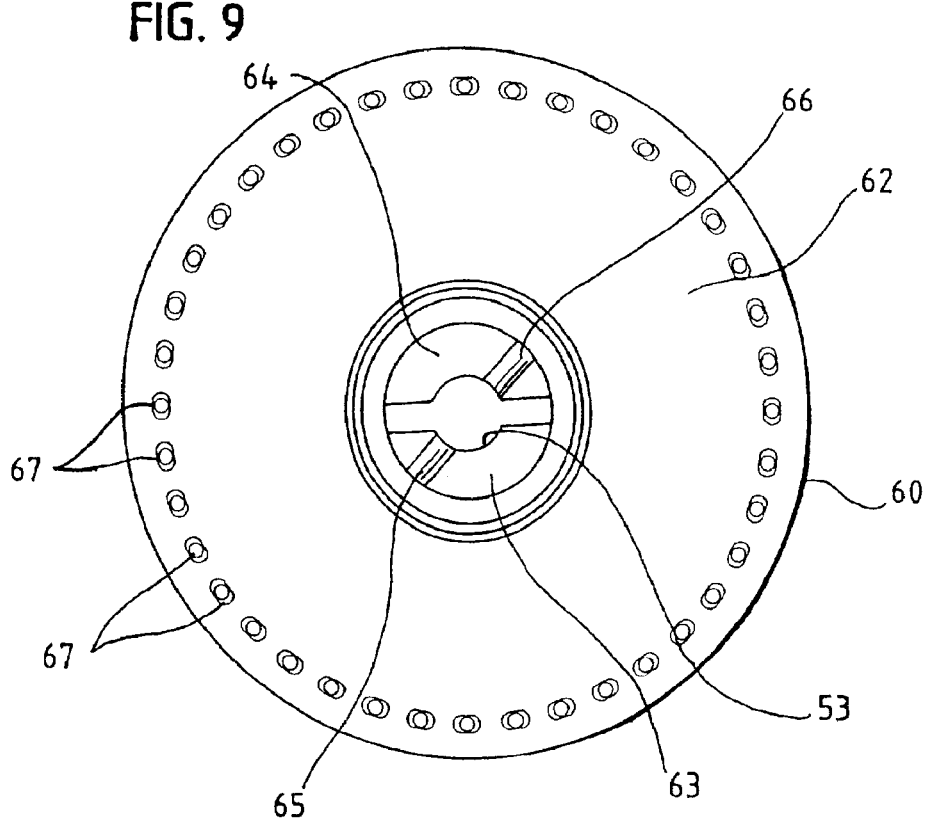
FIG. 9 is a rear elevational view of a seed disk for use in the metering unit shown in FIG. 4.
Figure 10:
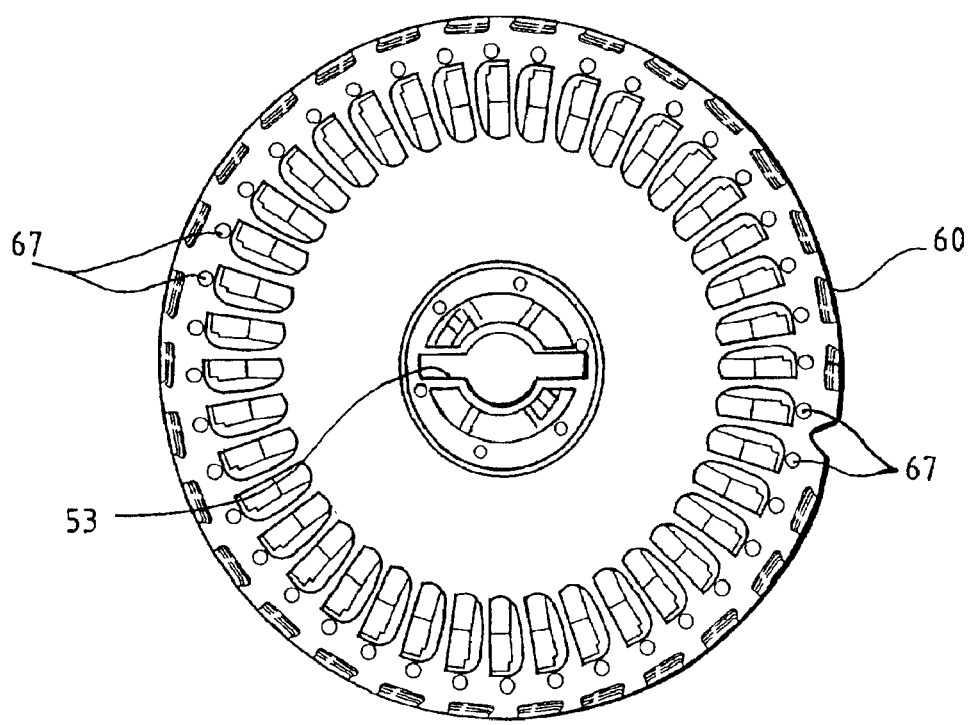
FIG. 10 is a front elevational view of the seed disk shown in FIG. 9.

Referring briefly to FIGS. 9 and 10, the seed disk 60 has a generally circular body with first and second planar surfaces 61, 62, and having a wing shaped central opening 53. The opening 53 is shaped to receive the winged hub handle 58 at the distal end of the retaining hub 56 of first housing member 50. Surrounding the central opening 53 on the second side 62 are two arcuately shaped opposing ramped surfaces 63, 64 and opposing locking notches 65,66 for locking the seed disk 60 to the hub 56. Extending around a circle which is spaced a short distance within the outer circumference of the seed disk 60 are a plurality of spaced transverse holes 67—67. The diameter of the cylindrical outer end of the seed disc 60 is a little less than the inner diameter of the tubular outer wall 52 housing member 50 of the metering unit 36 (and of the cylindrical outer wall of the second housing member 90, as is further described below).

Referring further to FIG. 4, the first housing 50 includes an upwardly opening access port 69 in the rear wall 52 into which the lower end of the chute from the hopper 32 extends, allowing seeds to enter the first housing member 50. Approximately diametrically opposite the access port 69 is a discharge opening 70 in the cylindrical wall 52 of the housing member 50 through which singulated seeds can drop and fall into the second chute 48 for planting. When assembled on a row unit 30, the metering unit 36 is oriented with the axis of the hub 56 horizontal and the discharge opening 70 positioned downward as is shown in FIG. 4.

Referring to FIG. 5, extending across the rear surface adjacent the hub 56 is an elongate brush 71 having one end connected to the outer wall 52 and the second end spaced a short distance from the cylindrical outer wall 52 leaving a gap 65 between the distal end of the brush 71 and the inner surface of the cylindrical outer wall 52. The brush 71 is positioned to separate seed entering the access port 69 from inadvertently reaching the discharge opening 70. The bristles of the brush 71 extending axially away from the rear wall 52 and brush against the first surface 61 of a seed disk 60 which has been retained the retaining hub 56 thereby creating a partial barrier between the outer wall 52 and the seed disk 60. The brush 71 insures that seeds singulated by the seed disk 60 are removed therefrom as the disk pass over the opening 70 in the wall 52 and further to separate the loose seeds entering through the port 69 from inadvertently entering the discharge opening 70 and falling into the chute 48.

Figure 7:
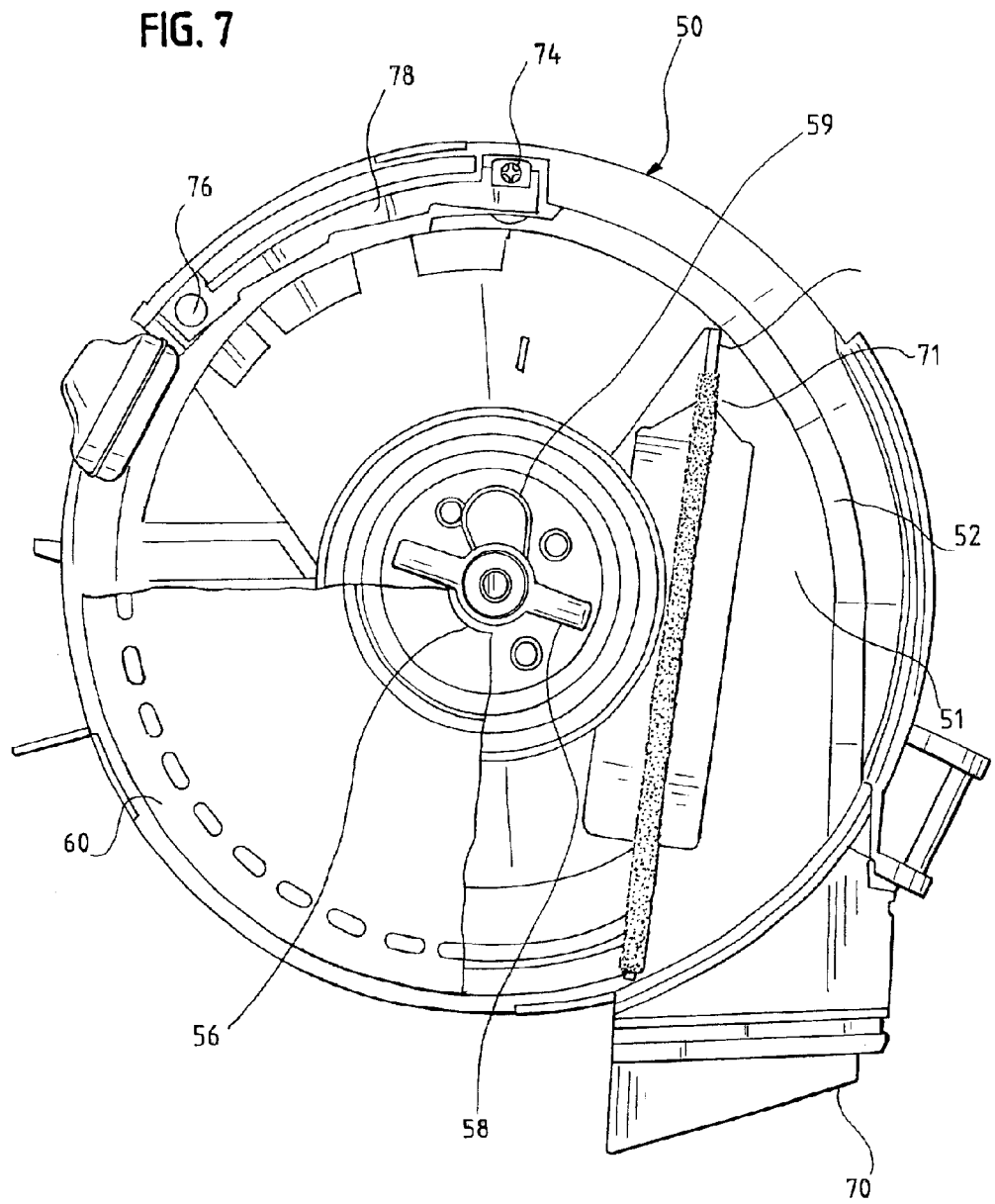
FIG. 7 is a front elevational view of the first housing member of the metering unit shown in FIG. 4 with the seed disk partially broken away.
Figure 11:
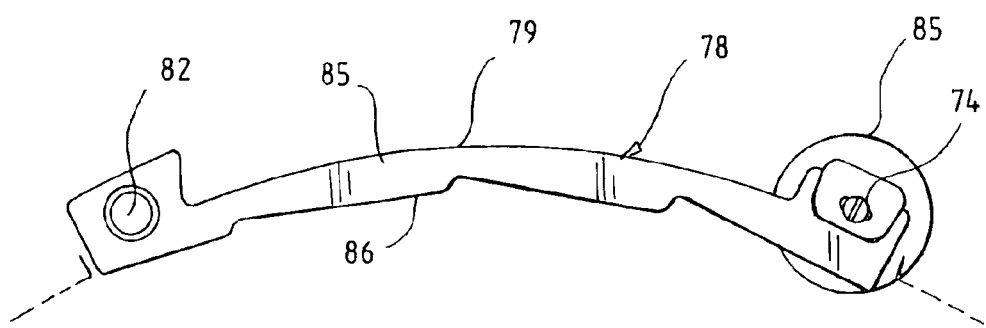
FIG. 11 is a front elevational view of a Deere double eliminator.
Figure 12:
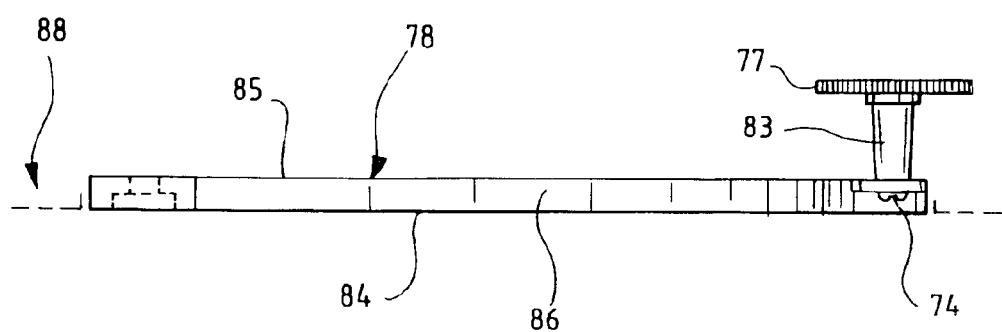
FIG. 12 is a side elevational view of the double eliminator of the type supplied by John Deere.

Referring to FIGS. 7, 11, and 12, positioned along the outer wall 52 of the first housing member 50 are a pair of axially orientated mounting holes, (not visible) through which the retention parts needed for securing an arcuate double eliminator 78 are inserted. The double eliminator 78, as manufactured by John Deere, has an elongate body having an arcuate convex outer side 79, and a generally arcuate inner side 86 having a plurality of steps, or ripples in the surface thereof. The forward and rearward surfaces 84, 85 thereof are planar and parallel to each other. The first end of the double eliminator has a pair of holes (not visible) either of which can receive a screw 74 which threads into the distal end of a tapered cam shank 83, rotatable by a thumb wheel 77. At the second end of the double eliminator is a third hole 82, and a removable retaining pin 76 extends through the third hole 82 and one of the mounting holes (not visible) on the first housing member 50. The cam shank 83 extends through the second mounting hole (not visible) such that rotation of the thumb wheel 77 and shank 83 will move the first end of the double eliminator radially with respect to the seed disk 60. As manufactured by John Deere, the double eliminator has a thickness 88 of about 3/16 inch.

When in use, the cam 83 is adjusted such that the end of the steps, or the tips of the ripples, of inner side 86 will partially cover the openings of the transverse holes 67—67 of a seed disk 60 as the seed disk 60 rotates with the hub 56. When the double eliminator is functioning properly, the end of the steps, or the peeks of the ripples, of inner side 86 will knock off the second seed where two seeds are held by the vacuum against one of the holes 67—67 of the seed disk 60. Referring further to FIGS. 4, 5, 6 and 8, the metering unit 36 includes a second housing member 90 attached by a pivot pin 92 to the first housing member 50. The second housing member 90 has a generally tubular outer wall 94 and a planar rear surface 96 such that it too has a cavity therein. The tubular outer wall 96 includes an intrusions portion 98 and around the inner edge of the outer wall 94 and the intrusion portion 98 is a rubberized sealing member 99 which seals against the second surface 62 of a seed disk 60 when the housing members 50, 90 are assembled against each other as further described below.

The second housing member 90 further has an aperture 100 in the rear wall 96 and the outer surface of the second housing member has a tubular protrusion 101 the inner opening of which communicates with the aperture 100 and is adapted to receive a vacuum hose, not shown, leading from a vacuum pump. Most John Deere planters 10 have one or two vacuum pumps 102, 104 (visible in FIG. 2 only).

Figure 6:
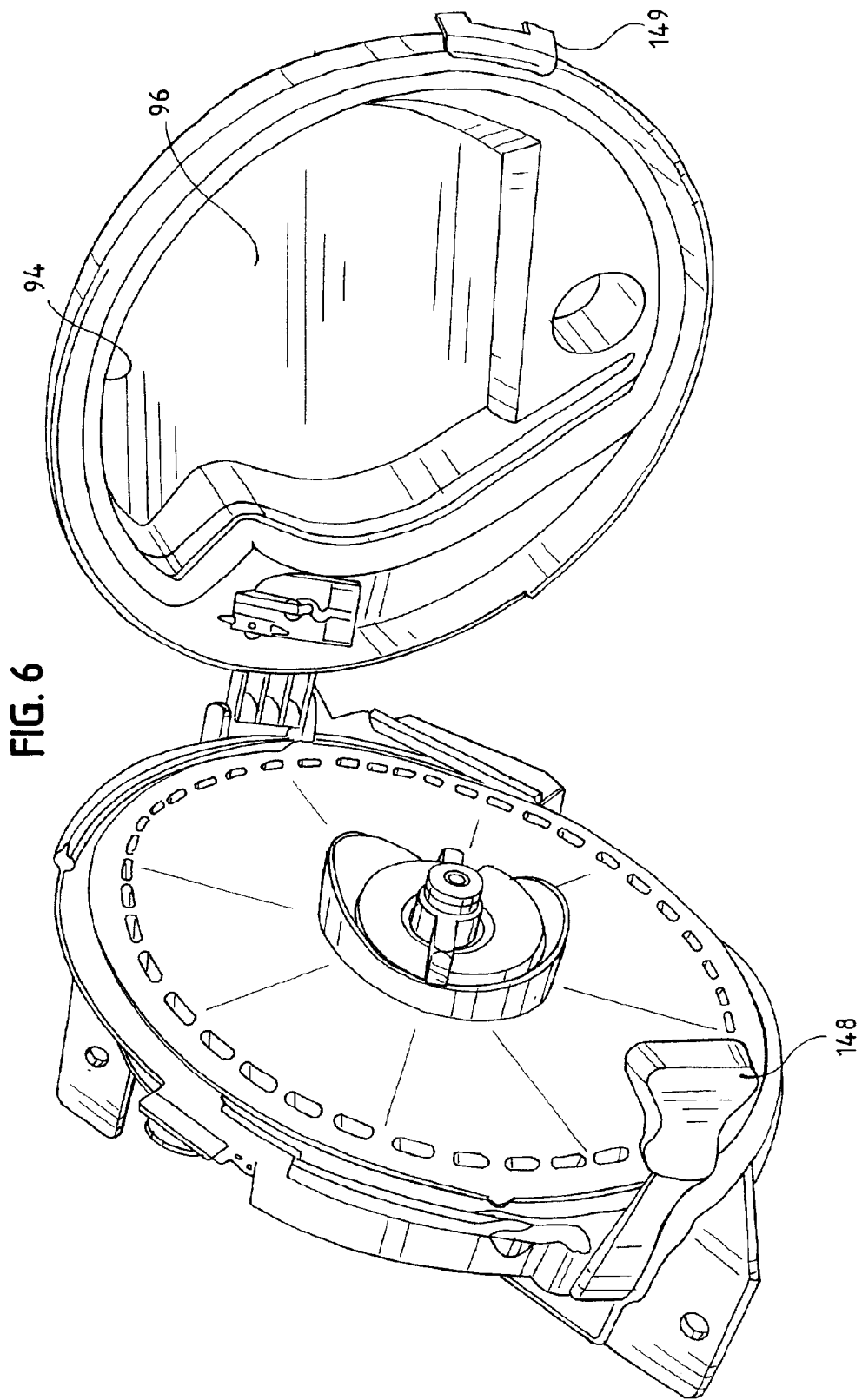
FIG. 6 is a second isometric view of the metering unit as shown in FIG. 4 with the feed wheel installed cross-sectional view of the metering unit shown in FIG. 4.
Figure 13:
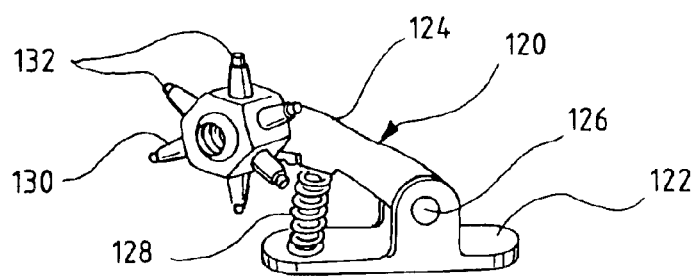
FIG. 13 is an isometric view of a knockout assembly as supplied by John Deere.

Referring to FIGS. 5, 6 and 13, within the intrusion portion 98 of the second housing member 90 is a third cavity defined by a portion of the cylindrical outer wall 94 and the wall of the intrusion portion 98, and a portion 110 of the rear surface 96. The pair of threaded holes, not shown, in the rear surface 110 are adapted to receive a knockout assembly 120 of the type manufactured by John Deere.

Referring only to FIG. 13, the knockout assembly 120 has a generally planar base member 122 with holes (not shown) therein through which threaded screws, not shown, can be inserted and threaded into the holes in the rear surface portion 110 for attachment of the knockout assembly 120 thereto. The assembly 120 further includes an arm 124 pivotally attached by a pin 126 to the base member 122 and a spring 128 for urging the arm 124 away from the base member 122. At the distal end of the arm 124 is a rotatable wheel 130 having a plurality of equally spaced radially extending prongs 132—132. The prongs 132—132 of the knockout assembly 120 are angularly spaced on the wheel 130 such that one prong 132 will extend into each of the holes 67—67 of the seed disk 60 as the disk 60 rotates around the hub 56.

Referring to FIG. 6, a latch assembly 148 on the first housing member 50 is adapted to engage a second latch member 149 on the second housing member 90 for retaining the two housing members 50, 90 engaged with one another, to thereby form the assembled metering unit 36.

As shown in FIG. 8, when the two housing members 50, 90 are latched in assembled relationship, with a seed disk 60 retained on the retaining hub 56 of the housing member 50, the interior of the metering unit 36 will be divided into two chambers. The first chamber is defined by the cavity in the first housing member 50 and the first surface 61 of the seed disk 60. The second chamber is defined by the cavity in the second housing member 90 and the second surface 62 of the seed disk 60. It should be appreciated that the second chamber excludes the intrusion portion 99 of the second housing member 90.

A vacuum is drawn by the vacuum pumps 102, 104 through lines connecting to the second housing member 90 and through the aperture 100 creating a vacuum in the second chamber of the metering unit 36. Meanwhile, seeds from within the seed hopper 32 drops through the chute 38 and through the port 69 into the first chamber. When the metering unit 36 is operating properly, the vacuum in the second chamber draws through the plurality of holes 67—67 of the seed disk 60 except for those holes 67—67 positioned beyond the sealing member 99 (defined by the intrusion portion 98). As the disk 60 rotates through the mass of seeds which accumulate near the port 69, one seed is drawn by the vacuum against each of the transverse holes 67—67. As the seed disk 60 continues to rotates within the metering unit 36, the singulated seeds are moved through the gap 65 at the distal end of the brush 71 and over the discharge opening 70 in the outer wall 52 of the second housing member 50. As each of the singulated seeds is moved over the discharge opening 70, the aperture of the associated hole 67 on the second side 62 of the seed disk 60 crosses the vacuum barrier formed by the sealing member 99, thereby releasing the seed from the first side 61. The seeds are thereby allowed to drop through the opening 70 in the outer wall 52 of the first housing member 50, through the second chute 48 to be planted.

The manuals available from John Deere describe at least eighteen different configurations of seed disks 60, each of which is made of a hard plastic having material therein which resist the build up of static electricity. The seed disks differing in the number of holes 67—67 therein, the diameter of the holes 67—67, and the diameter of the circle defined by the centers of the holes 67—67. Also, the pumps 102, 104 which draw the vacuum in the cavity formed by the second housing member 90 (the vacuum is measured in inches of water) is adjustable from a minimum of two inches of water to a maximum of fifteen inches of water.

Figure 16:
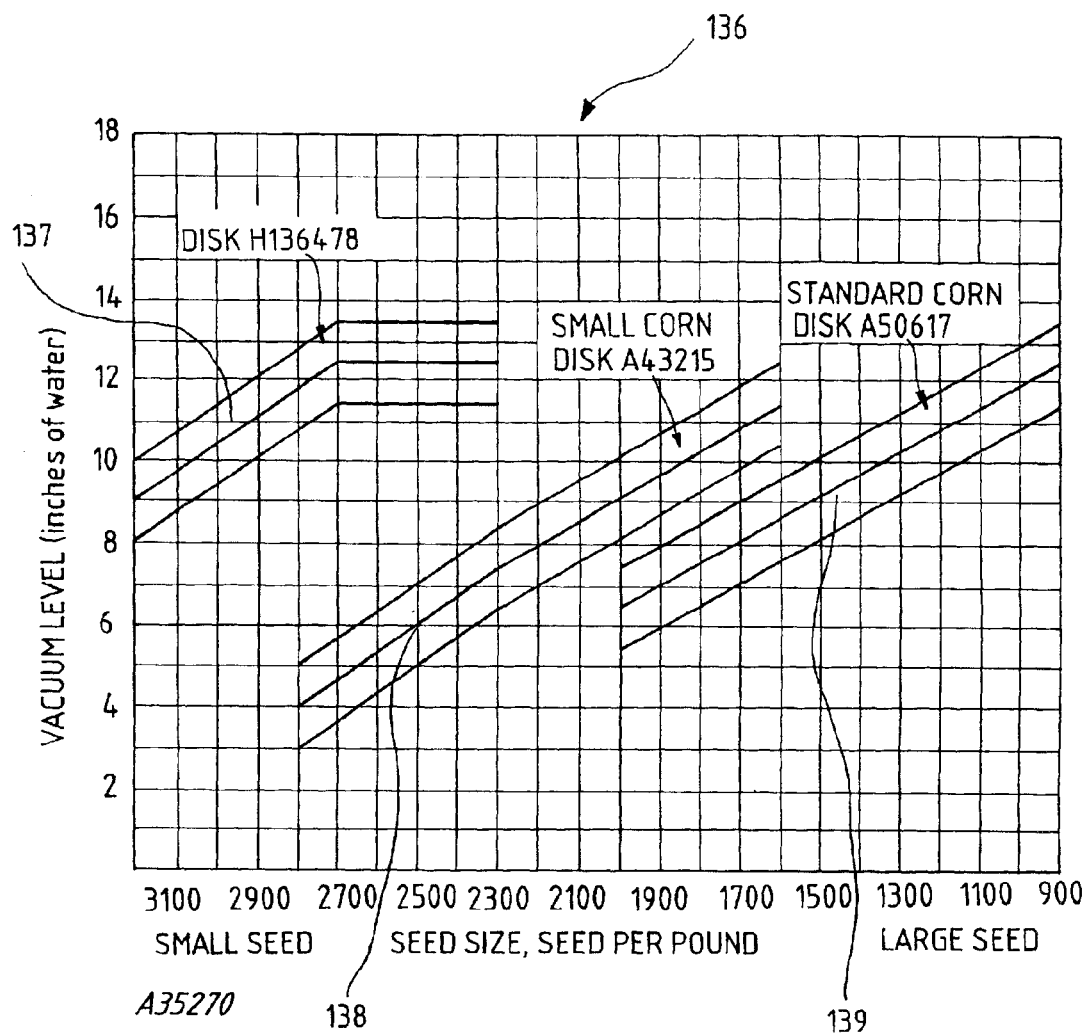
FIG. 16 is an approximate rendition of a chart provided by John Deere for selecting a seed disk and selecting a vacuum setting needed to plant the various sizes of feed corn seed.

Referring to FIG. 16, to accommodate different sizes of seeds, the manuals from John Deere provide a planting chart similar to the chart 136. To properly operate the planter 10, the operator must first use the chart 136 to look up the size of seed to be planted. The graphs 137, 138, 139 on the chart 136 are used to identify the seed disk 60 having the configuration of holes 67—67 suitable for use with the seed size to be planted, and will show a recommended range of vacuum settings for setting the vacuum pumps 102, 104. According to the John Deere manuals, disk A136478 should be used for planting small corn seed, disk A43215 should be used to plant medium size seed, and disk A50617 should be used to plant the larger sizes of corn seed.

If, during the course using the planter 10, it is found that the planter 10 is under planting seeds or over planting seeds (operating at less than 99% efficiency or over 101 efficiency), the operator must stop his tractor and make adjustments to the vacuum drawn by the pumps 102, 104. Also, if the operator exhausts his supply of a given size of seed and is required to significantly change seed size, he must unlatch all of the latch assemblies 148, 149 of the metering units 36 and replace the seed disks 60 therein with another disk having the configuration of holes 69—69 suitable for the size of seed which he is now using. The instructions from John Deere may further require the installation and adjusting or removal of a double eliminator 78, and/or the installation or removal of a knockout assembly 120. Where a knockout assembly 120 is already in use, replacing a seed disk 60 may require the replacement of the knockout assembly 120 because the arm 124 must be configured differently for each of the seed disks 60. Similarly, the changing of a seed disk 60 may require the adding, removal, or adjustment of a double eliminator 78.

Figure 14:
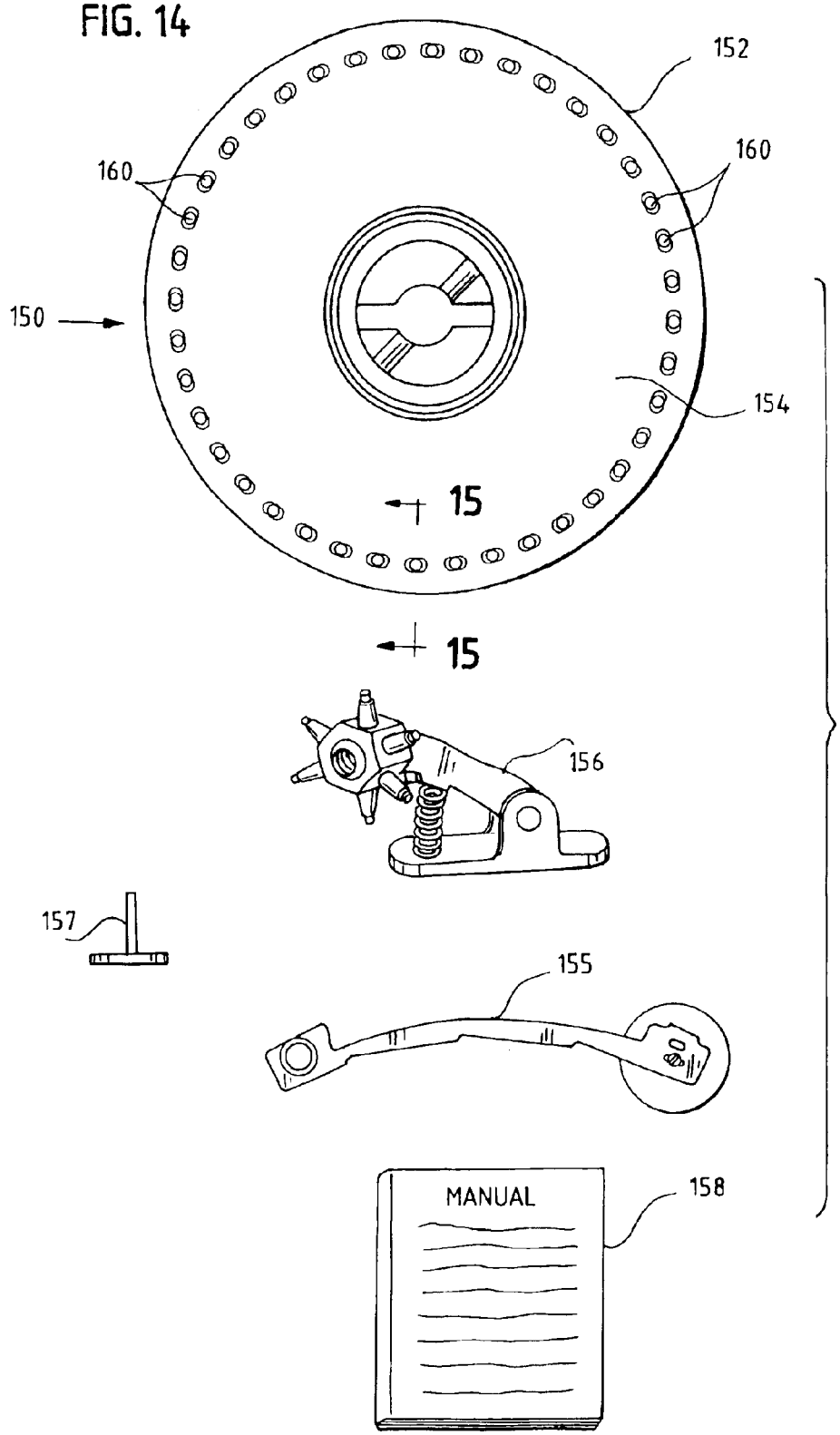
FIG. 14 is a schematic view of a kit for use in the metering unit shown in FIG. 4.
Figure 15:
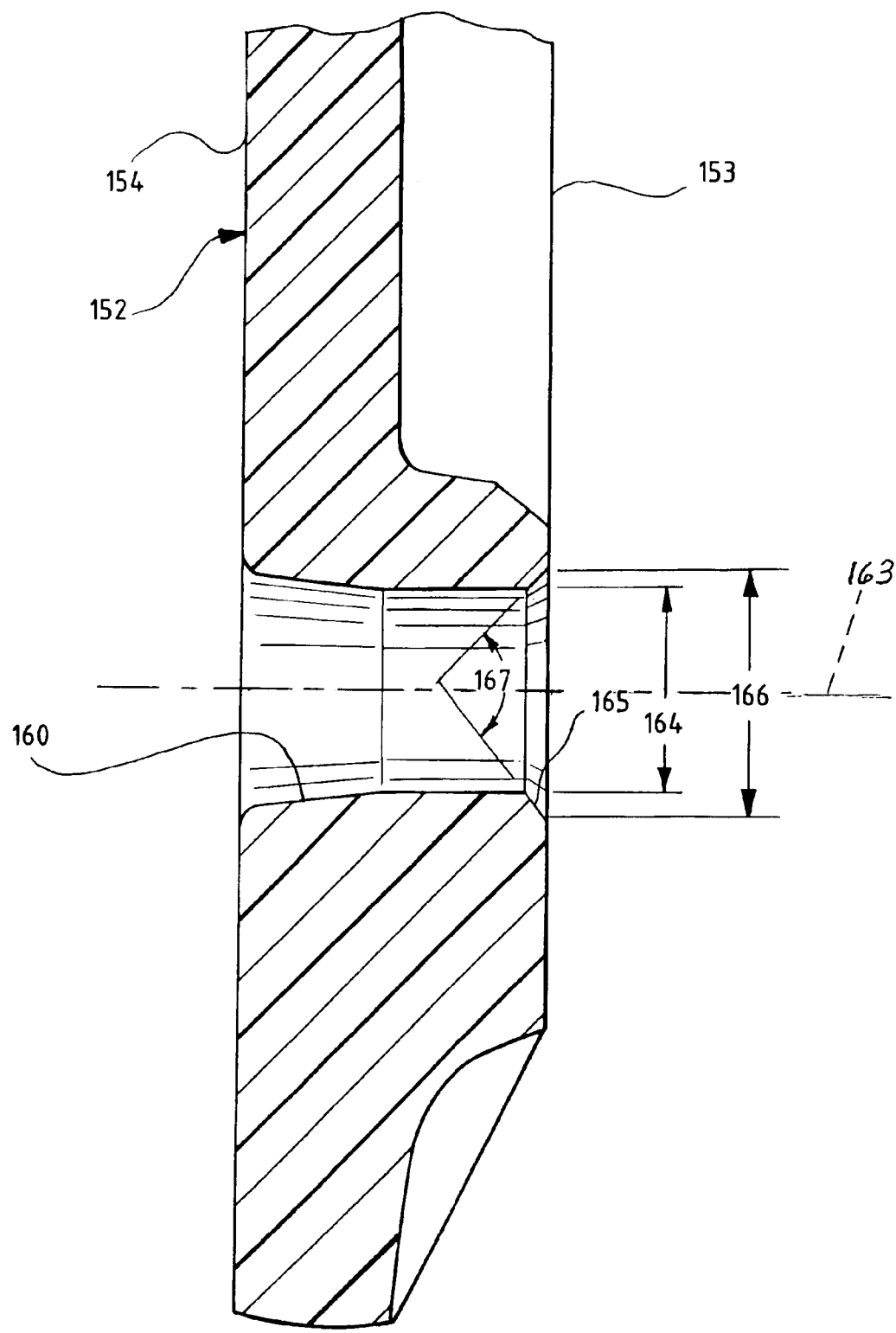
FIG. 15 is a fragmentary enlarged cross-sectional view of a seed disk in accordance with the present invention.

Referring to FIG. 14, a kit 150 in accordance with the present invention can be used to improve the efficiency of a planter 10 to plant any size seed of corn seed without requiring re-adjustment of the vacuum drawn by the pumps 102, 104, or requiring replacement of the seed disk. The kit 150 includes a seed disk 152 constructed in accordance with the invention, having a first side 154 and a second side 153, a double eliminator 155, also constructed in accordance with the invention, a knockout assembly 156, an alignment tool 157, and a set of instructions 158 regarding the use of the kit 150.

The planter 10 is intended to be operated at speeds from 4.0 miles per hour (mph) to 6.5 mph, and for planting corn seed, the efficiency is maximized when it is pulled at a speed of about five miles per hour. The operators of most planters, however, prefer to pull their machines at six miles per hour, causing a correspondingly faster rotation of the associated seed disk and a reduction in the efficiency of the planter. The seed disk 152 of the present invention has forty equally spaced holes 160—160 the centers of which define a circle having a radius R1, which is a little less than the radius R2 of the seed disk 152. The provision of forty holes 162 enables the seed disk 152 to rotate more slowly within the metering unit 36 for any given speed of the seeder 10 than is the case where a seed disk 60 having thirty holes 67—67 is employed. The provision of forty holes 160—160 requires that the gearing for the seed disk 152 be correspondingly changed so that the corn seeds are planted the desired distance apart from one another (4.4 inch to 11.2 inch), for all speeds within the 4.0 to 6.5 mph range. The result is that the reconfigured feeder will operate at a speed of six miles per hour without causing a reduction in its efficiency.

Referring to FIGS. 9, 10, 14 and 15, the diameters of the holes 67—67 of the prior art seed disks 60 vary from one disk to another to suit the type of seed that the disk is intended to plant and the maximum diameter of a vacuum hole 67 of any seed disk provided by John Deere is $3/16$ inch. The diameter 164 of each hole 160 of seed disk 152 is $3/16$ inch±$1/64$ inch and the holes 160—160 each have a longitudinal axis 163 that is oriented generally perpendicular to the first surface 153. If the size of the hole 160 is less than $3/16$ inch, the vacuum drawn through the holes will be correspondingly reduced thereby reducing the ability of the seed disk to retain a large kernel of corn seed against the hole. If the size of the hole 160 is greater than $3/16$ inch, the smaller sizes of corn seed may become wedged in the hole 160, thereby reducing the efficiency at which the planter operates. Also, each of the holes 160 has a countersink 165 in the first surface 153 of the disk 152 against which seeds are drawn when the disk is in the metering unit 36, the countersink having a diameter of $15/64$±$1/64$ inch. The countersink 165, which may be either cylindrical or angular as shown, is critically important in retaining the larger sizes of seed against the opening of the holes 160—160 because it increases the area across which the force of the vacuum is applied. I have found that a tapered or frustoconical countersink with a combined angle 167 of 60 degrees yields the best results.

Referring to FIGS. 14, 17, 18, 20 and 21, the kit further includes a double eliminator 155. The double eliminator 155 of the present invention has arcuately shaped outer side 172 and a stepped inner side 174 which appear similar to the outer and inner sides 79, 86 of the prior art double eliminators 78. In the preferred embodiment the double eliminator 155 has four steps 190, 191, 192, 193 along the inner side 174, each of the steps has an outer end portion 201, 202, 203, 204 respectively, and between each pair of the successive steps 190–193 are risers 194, 195,196, respectively. As is shown in FIG. 21, the surfaces defined by each of the four steps 190, 191, 192, 193 define tangent to a circle having a radius of R1 (the circle defined by the centers of the holes 167—167). The steps 190–193 are arranged on the double eliminator 155 with each step defining a fragment of a tangent line, the fragment joining the circle of radius R1 at the end portion 201, 202, 203, 204 of each of the step 190–193 respectively. When the double eliminator is positioned on the first housing member 50, each of the steps 190–193 slopes radially inwardly, with the ends joining the risers 194–196 being the radially outward ends, and the outer end portions 201–204 of the steps being the radially inward ends thereof.

The double eliminator 155 further has only one hole 176 at the first end thereof (instead of two, in the John Deere eliminator 78) and a second hole 177 at the second end thereof. Instead of the retaining pin 76 provided by John Deere, a bolt 178 is fitted through mounting hole 72 on the first housing member 50 and hole 177 of the double eliminator 155 and the parts are retained in place by a nut 179. The threaded end of a screw 182 is extended through the hole 176 at the first end of double eliminator 155, through the mounting hole 73 on the first housing member 50 and into a threaded hole in the. A tapered cam shank 180 is retained to the first end of the double eliminator 155 by a screw 182 through the hole 76 at the first end thereof, and the axis of the screw 182 is parallel to but offset from the axis if the shank 180, as in the case of the John Deere double eliminator 78. A hex head 184 is provided on the cam shank 180 instead of the thumb wheel 76.

As shown in FIG. 18 and 20 the seed disk 155 further has a notch 165 in the outer circumference thereof to allow a screw driver to have access to the head of the screw 182 while the seed disk is attached to the hub 56 to tighten the cam 180 into the tapered bore 73 of the first housing member 50.

The seed disk, as depicted in FIG. 20, rotates clockwise with seed being drawn by the vacuum against the holes 160—160 on the first side 153 of the seed disk 152 (the first side being visible in this view). As the seed disk rotates, seeds held by the vacuum against the holes 160—160 successively encounter the angled surfaces of steps 190–193 of the double eliminator 155, thereby applying a force against the seeds, in the form of an impact, the force being applied parallel to the surfaces 153, 154 of the seed disk 152. Where only one seed is held against a hole 160 by the vacuum, none of the successive impacts is sufficient to dislodge the seed from it position as it is held by the vacuum against the hole 160. In some cases, however, two seeds will be drawn by the vacuum against a single hole 160, and when the two seeds encounter the steps 190–193 of the double eliminator the successive impacts of the four steps 190–193 will dislodge one of the two seeds held against the hole 160. If the double eliminator operates properly, whenever two seeds are retained against a hole the second seed will be knocked off, and the planter 10 will never plant more than one seed in a hole.

To operate properly the four steps 190–193 of the double eliminator 155 must all apply approximately the same impact against the seeds held against the seed disk 155, and therefore the double eliminator must be positioned so that the outer end portions 201–204 of the steps 190–193 equally obstruct the holes 160—160 of the seed disk 155. The cam 180 provides a radial adjustment for the cam end of the double eliminator 155, but the pivot end is unadjustably secured by a pin or screw 178 through the hole 177. Where the hole 177 is not properly positioned with respect to the steps 190–193 the double eliminator 155 will not operate properly. As shown on FIG. 21, I have fount that for a John Deere metering unit 36 the double eliminator 155 will operate most efficiently where the perpendicular distance 206 between the center of mounting hole 177 and the surface of step 190 is about 0.033 inch.

I have found that the hole 82 of the double eliminator 78 as manufactured by John Deere is not properly positioned with respect to the steps thereof and that there is approximately 0.028 inch between the center of the hole 82 and the surface of the first step thereof. When a John Deere double eliminator 78 is assembles to the first housing member 50, only two of the four steps of the double eliminator 78 apply the desired force against seeds as they are moved into the double eliminator 78 by the rotating seed disk 60. The result is that the John Deere double eliminator 78 frequently fails to dislodge one of the seeds when two seeds are drawn against a vacuum hole of a seed disk.

The double eliminator 155 of the present invention also differs from that of the prior art double eliminator 78 in that it has a thickness 175 of no more than $11/164$ inch. The $3/16$ inch thickness of the John Deere double eliminator 78 causes the forward surface thereof to engage the first surface 61 of the seed disk 60 and interfere with its operation. To accommodate the thickness of the John Deere double eliminator the retaining hub 56 must be axially adjusted to move the first surface 61 of the seed disk 60 outward of the rear wall 54 of the first housing member. This requires the removal of the spring locking pin 59, the rotation of the retaining hub 56 with respect to the inner tubular shaft to unscrew the hub 56 with respect to the drive shaft, not shown, after which the locking pin 59 is reinserted. When this is done the plane defined by the first surface 61 of the seed disk 60 will be spaced from the plane defined by the open end of the cylindrical wall 52 of the first housing member 50, thereby allowing small seeds to work between the outer end of the seed disk 60 and the inner surface of the metering unit housing.

Where the thinner double eliminator 155 of the present invention is employed, the seed disk 152 of the present invention may be retained on a retaining hub 56 with the locking pin 59 assembled in the same orientation as when there is no double eliminator in use, thereby avoiding the misalignment of the parts caused by the use of the John Deere double eliminator 78. The wedging of the corn seed between the outer end of a seed disk and the inner surface of the metering unit can result in cracking of corn seed and the planting of defective corn seed.

Referring to FIGS. 14, 17, 18, 19 and 20, in accordance with the invention the cam 180 of the double eliminator 155 must be properly adjusted to avoid the inadvertent planting of two seeds in one hole during the operation of the planter 10, and accordingly an alignment tool 157 is provided. The adjustment of the double eliminator 155 is carried out by using the hex head 184 to turn the cam 180 within the tapered bore 72. The alignment tool 157 consists of a cylindrical peg 185 having a diameter of $1/8$th inch and a length of about one inch, and a planar disk 186 mounted perpendicularly to one end of the peg 185. As shown in FIGS. 18 and 20, the adjustment of the double eliminator 155 is carried out by using the hex head 184 to turn the cam 180 within the tapered bore 73. The double eliminator 155 in properly aligned in the first housing member 50 by assembling the seed disk 152 on the hub 56 of the first housing member 50, rotating it until the notch 165 exposed the head of the retaining screw 182. The peg 185 of the alignment tool 157 is inserted through one of the vacuum holes 160 of the seed disk 152 adjacent the first end of the double eliminator 155 (the end to which the cam 180 is attached). The cam 180 is then adjusted until the side 176 of the double eliminator 155 presses against the peg 185 of the alignment tool 157. When the peg 185 is in contact with both the inner wall of the vacuum hole 160 and the fourth step 193 of the double eliminator 155, a screw driver is inserted through the notch 165 of the seed disk 152 and the screw 182 tightened. Tightening the screw 182 locks the cam 180 in place, after which the peg 185 of the alignment tool 157 is withdrawn from the hole 160 in the seed disk 152.

The knockout assembly 156 of the present invention is identical to the knockout assembly 120 of the prior art where the prongs 132—132 on the wheel 130 thereof are spaced in a position to engage the forty holes 160—160 of the seed disk 152. John Deere makes a knockout assembly usable with its forty-hole disks, and most importantly, with its forty hole sweet corn disks sold as part numbered A52391 and A52390. Since a knockout assembly suitable for use with the invention is already available from John Deere the kit 150 can be sold without the knockout assembly 156, in which case the instructions 158 will inform the user to acquire and insert a knockout assembly into the metering units of his planter 10, and to install and adjust the double eliminator using the alignment pin 157.

When the seed disk 152, the double eliminator 155, and a knockout assembly 156 are assembled into all of the metering units 36 of a the planter 10, the pumps 102, 104 can be adjusted to provide a vacuum of ten to twelve inches of water, the planter 10 can be pulled at a speed of six miles an hour an hour and will plant between 99% and 101% efficiency for all available sizes of feed corn seed. Accordingly, an operator can operate the planter 10 without making periodic adjustments to the vacuum and without replacing the seed disk 152 regardless of the size of the seed which inserted into the hoppers 32 of the row units 30—30. The device will plant reliably if the vacuum is set greater than 12, however, such higher settings will cause the vacuum pumps to operate faster and will require the use of more energy. When the vacuum is set below 9 in will be insufficient to retain the larger corn seed.

Although the John Deere planter will operate reliably after it has been modified as described above, the introduction of less than all the elements of the invention within a metering unit can significantly improve the performance of the planter. John Deere manufactures a sweet corn seed disk 60 having a circle of forty vacuum holes 67—67 having diameters of $3/16$ inch, the disk sold under part number A52391. John Deere also manufactures a knockout assembly configured for use with seed disk part number AA37348, and the double eliminator provided by John Deere can be used with these parts. The mere assembly of these parts into the metering units of the John Deere planter will not significantly improve the performance of the planter. However, the vacuum holes 67—67 of seed disk part number A52391 can be easily drilled to a diameter of $13/64 \pm 1/128$ inch, and this will result in a seed disk with a wider range of planting capabilities. With the vacuum permanently set at 11 to 12 inches of water, a row unit with a metering unit having this configuration will plant both small and medium size corn seed and will reliably maintain an efficiency of 96 percent to 104 percent. Farmers who have tested metering units fitted accordingly have been very pleased with this improvement.

The seed disk 152, having vacuum holes 160 with a countersink 165 as described, is the single most important element of the invention and the use of the seed disk 152 in conjunction with a double eliminator and knockout assembly of the type manufactured by John Deere will greatly improve the efficiency of the John Deere vacuum planter. The seed disk therefore could be marketed along with instructions 158 directing the user to acquire and install a prior art double eliminator and a knockout assembly along with the seed disk 152. The double eliminator 155 could also be marked alone or in conjunction with the alignment tool 157.

While the present invention has been described with respect to a single embodiment, it will be appreciated that many modifications and variations may be made without departing from the true spirit and scope of the invention. It is, therefore, the intent of the appendant claims to cover all such modifications and variations which fall within the true spirit and scope of the invention.

What is claimed:

1. A seed disk for use to plant corn seed in a seed planter having a metering unit for retaining said seed disk, said metering unit having a first cavity defined by a first side of said seed disk in which seeds are introduced and a second cavity defined by a second side of said seed disk in which a vacuum is drawn, said seed disk comprising a seed disk body having a first side defining a plane, a second side, and a plurality of spaced vacuum holes extending from said first side to said second side, said vacuum holes having an axis perpendicular to said plane, said vacuum holes having diameters no greater than $13/64$ inch, and said vacuum holes having a countersink on said first side, said countersink having a maximum diameter of $1/4$ inch.

2. A seed disk in accordance with claim 1 wherein said countersink is frustoconical around said axis of said vacuum holes.

3. The seed disk of claim 1 wherein said vacuum holes have a minimum diameter of $11/64$ inch.

4. The seed disk of claim 1 wherein said countersinks have a minimum diameter at said plane defined by said first side of $7/32$ inch.

5. The seed disk of claim 1 wherein said countersinks are frustoconical.

6. A seed disk for use in a seed planter having a metering unit for retaining said seed disk, said metering unit having a first cavity defined by a first side of said seed disk in which seeds are introduced and a second cavity defined by a second side of said seed disk in which a vacuum is drawn, said seed disk comprising a seed disk body having a first side defining a plane, a second side, and a plurality of spaced vacuum holes extending from said first side to said second side, said vacuum holes having an axis perpendicular to said plane, said vacuum holes having a countersink in said first side, said countersink having a maximum diameter of $1/4$ inch, and said countersink being frustoconical around said axis of said vacuum holes.

7. A seed disk in accordance with claim 6 wherein said vacuum holes have a maximum diameter of $13/64$ inch.

8. The seed disk of claim 6 wherein said countersinks have a minimum diameter at said first surface of $7/32$ inch.

* * * * *

UNITED STATES PATENT AND TRADEMARK OFFICE
CERTIFICATE OF CORRECTION

PATENT NO. : 6,932,236 B2  Page 1 of 1
APPLICATION NO. : 10/109194
DATED : August 23, 2005
INVENTOR(S) : Dale A. Ven Huizen It is certified that error appears in the above-identified patent and that said Letters Patent is hereby corrected as shown below:

Column 2 line 9, after "where" insert --it--

Column 2 line 23, after "will" delete "on" and insert --no--

Column 3 line 61, after "disk" delete "have" and insert --having--

Column 4 line 31, after "feed" delete "wheel" and insert --disk-- and after "installed" delete "cross-sectional"

Column 4 line 32, delete "view of the metering unit shown in Fig. 4"

Column 6 line 45, after "retainer" insert --by--

Column 10 line 24, after "two" insert --as--

Column 10, delete lines 29 to 31 and from line 32 delete the words "into a threaded hole in the"

Column 10 line 36, after "axis" delete "if" and insert --of--

Column 12 line 48, after "below 9" delete "in" and insert --it--

Signed and Sealed this

Twelfth Day of December, 2006

JON W. DUDAS
*Director of the United States Patent and Trademark Office*